Dec. 14, 1937.   J. N. PATTISON, JR   2,101,870
MACHINE FOR ENVELOPING ARTICLES
Filed March 21, 1935   6 Sheets-Sheet 6
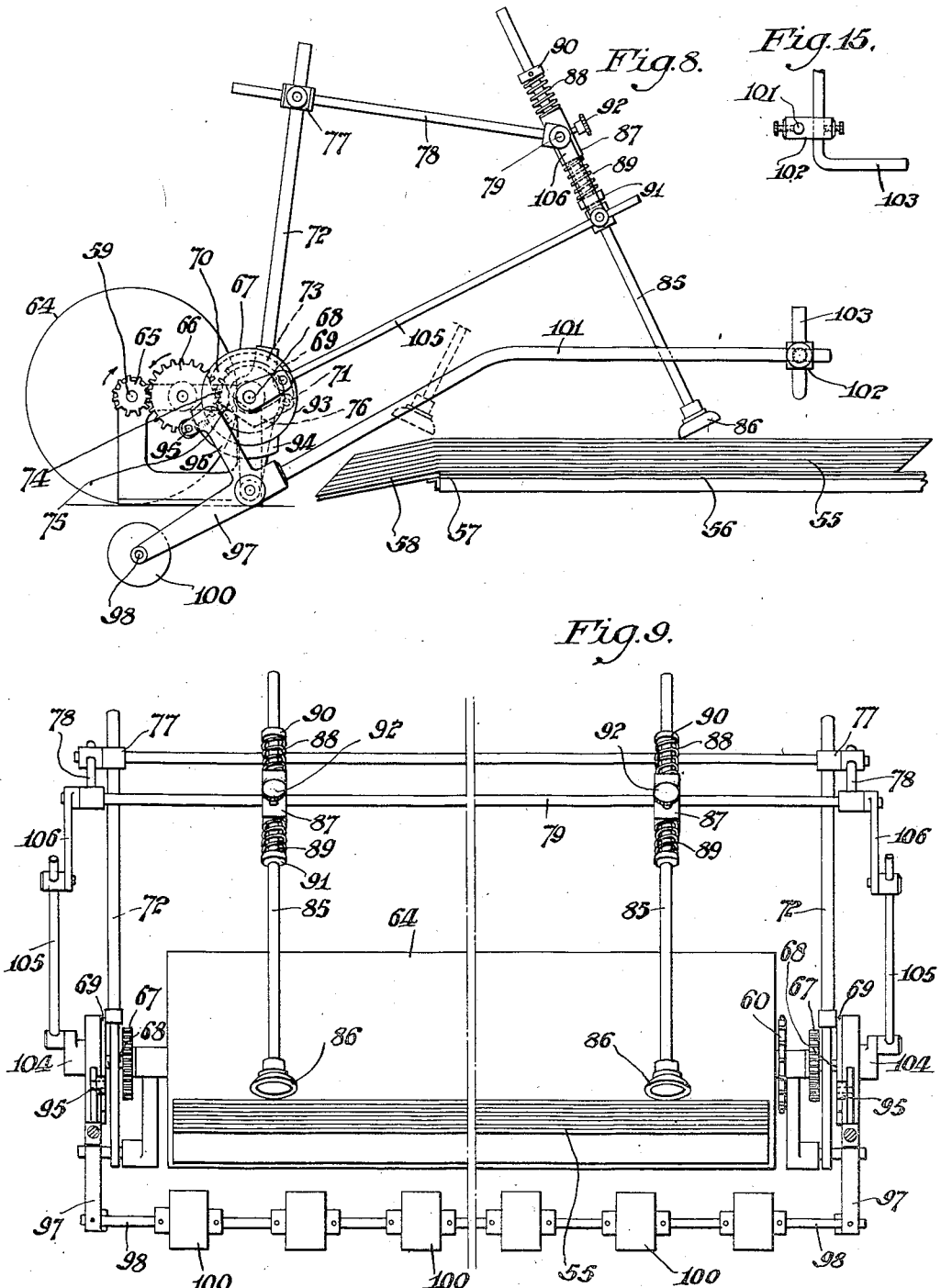
Inventor:
Joseph N. Pattison, Jr.
By J.T. Wobensmith
Attorney.

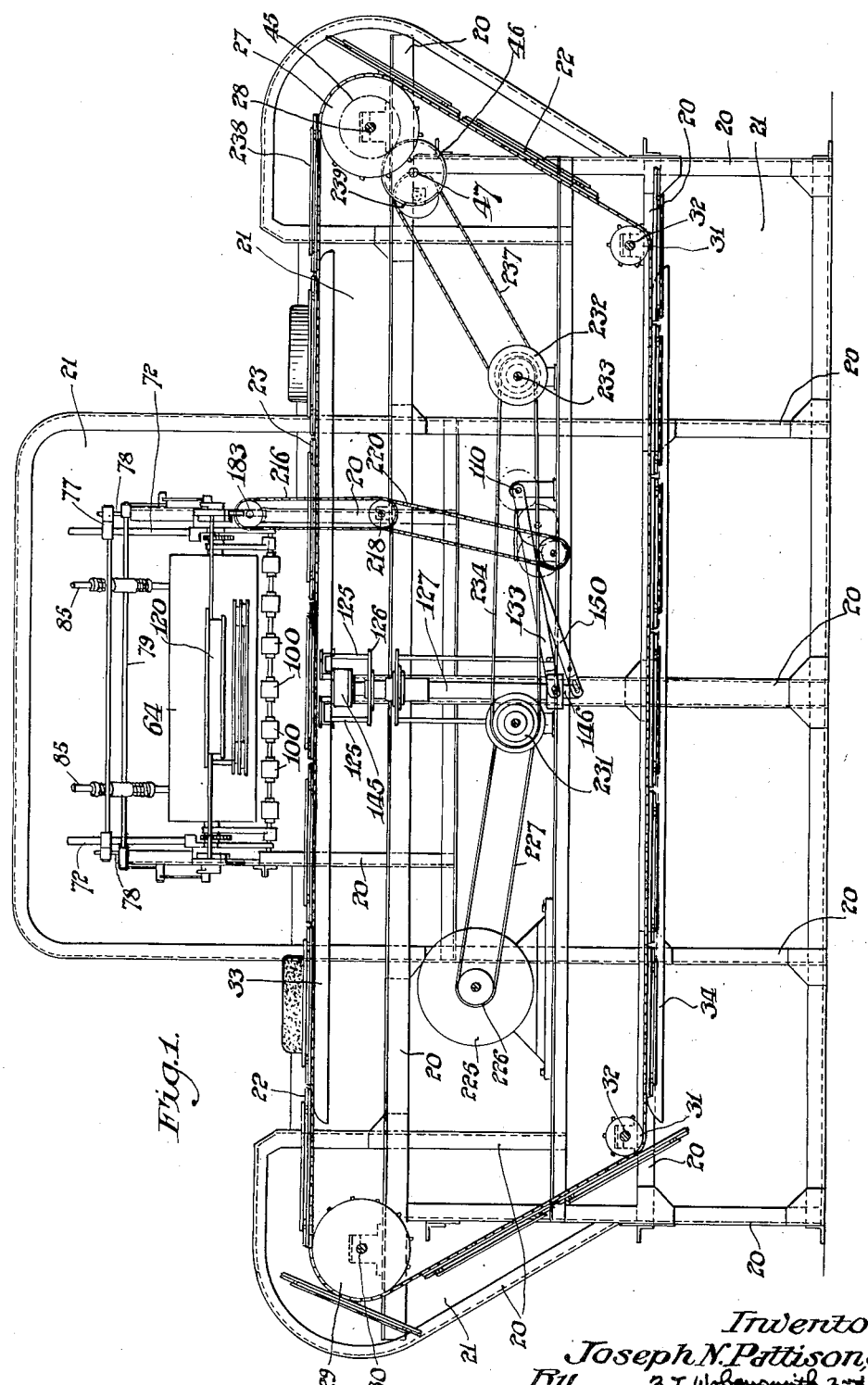

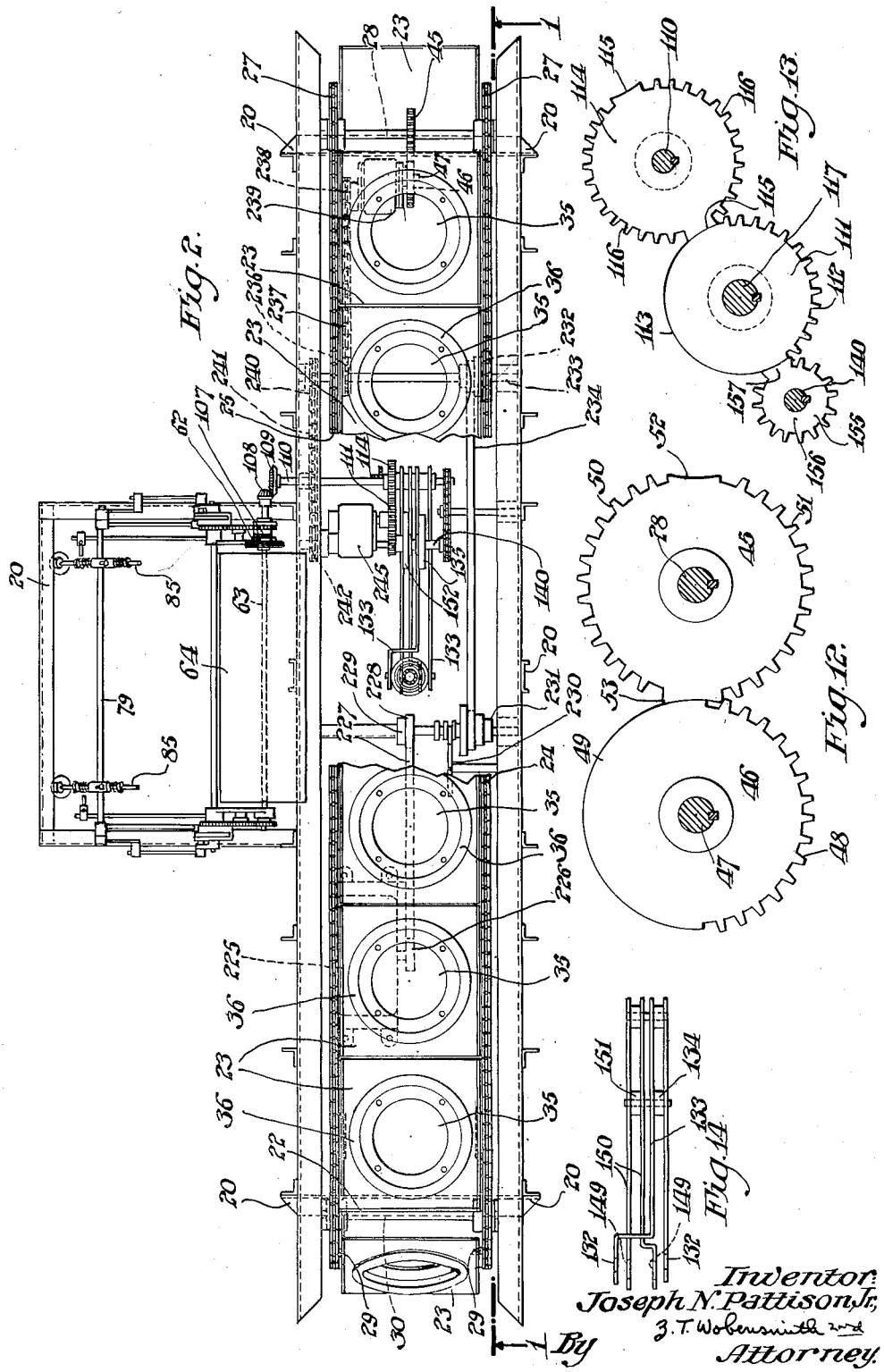

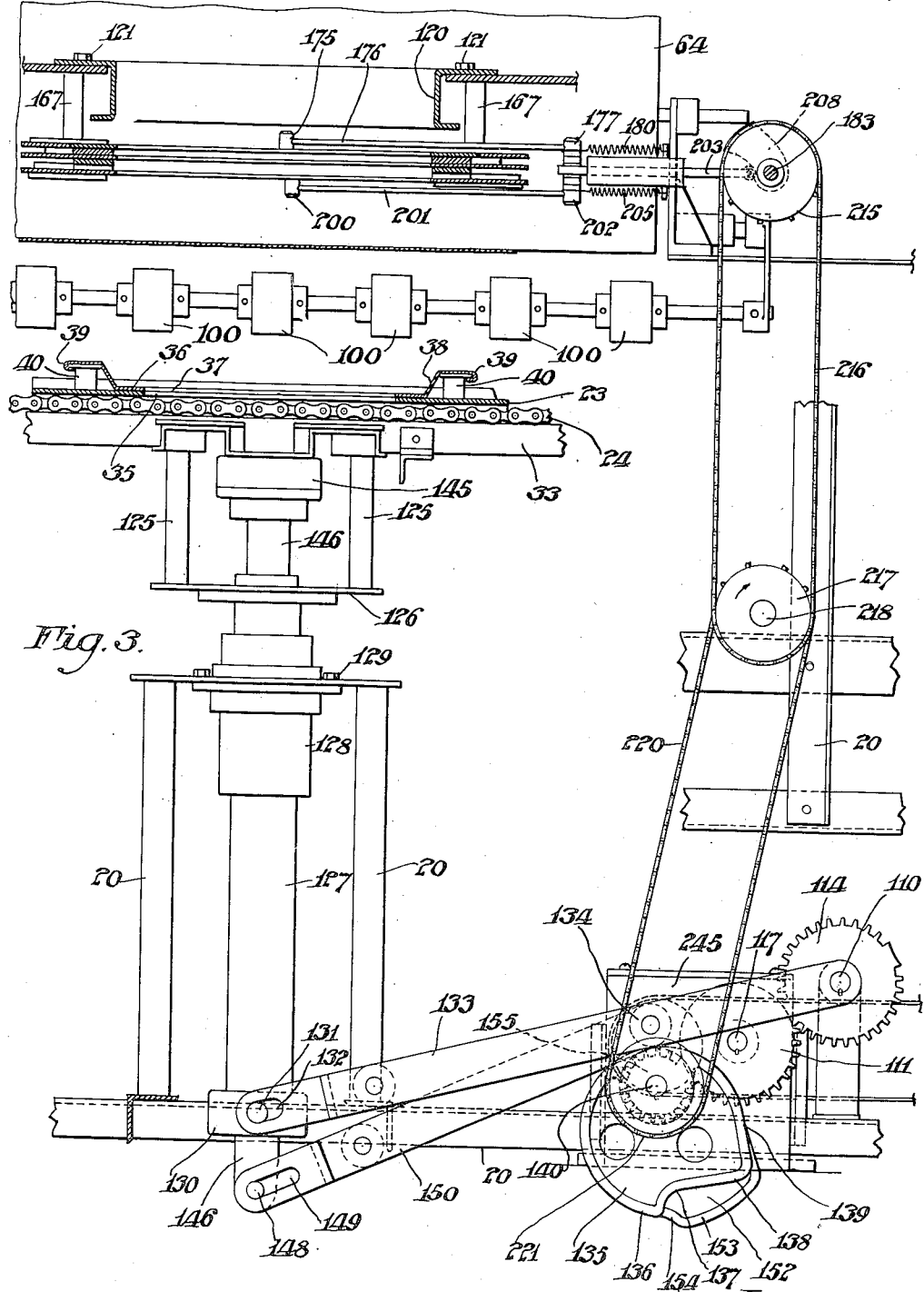

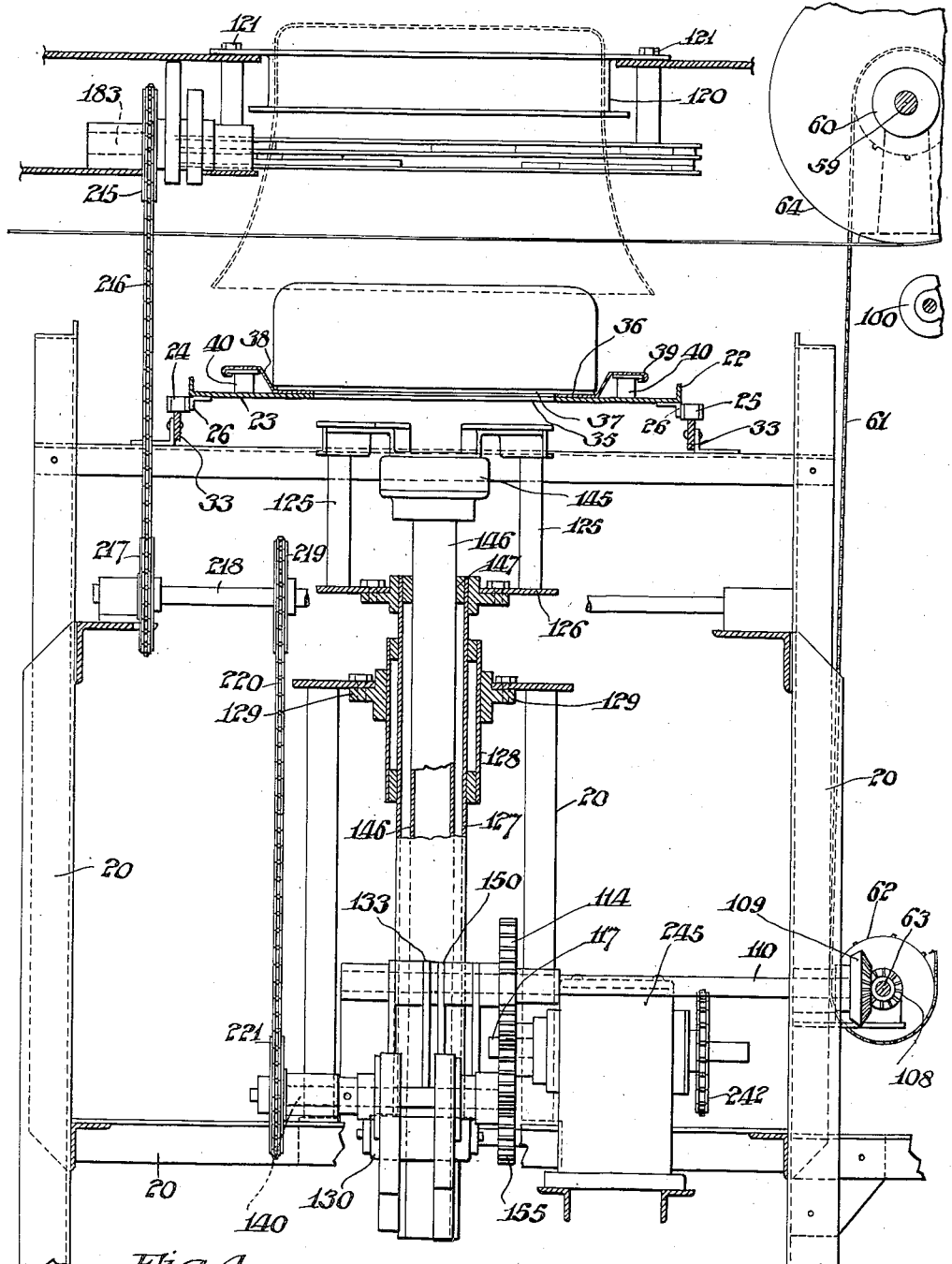

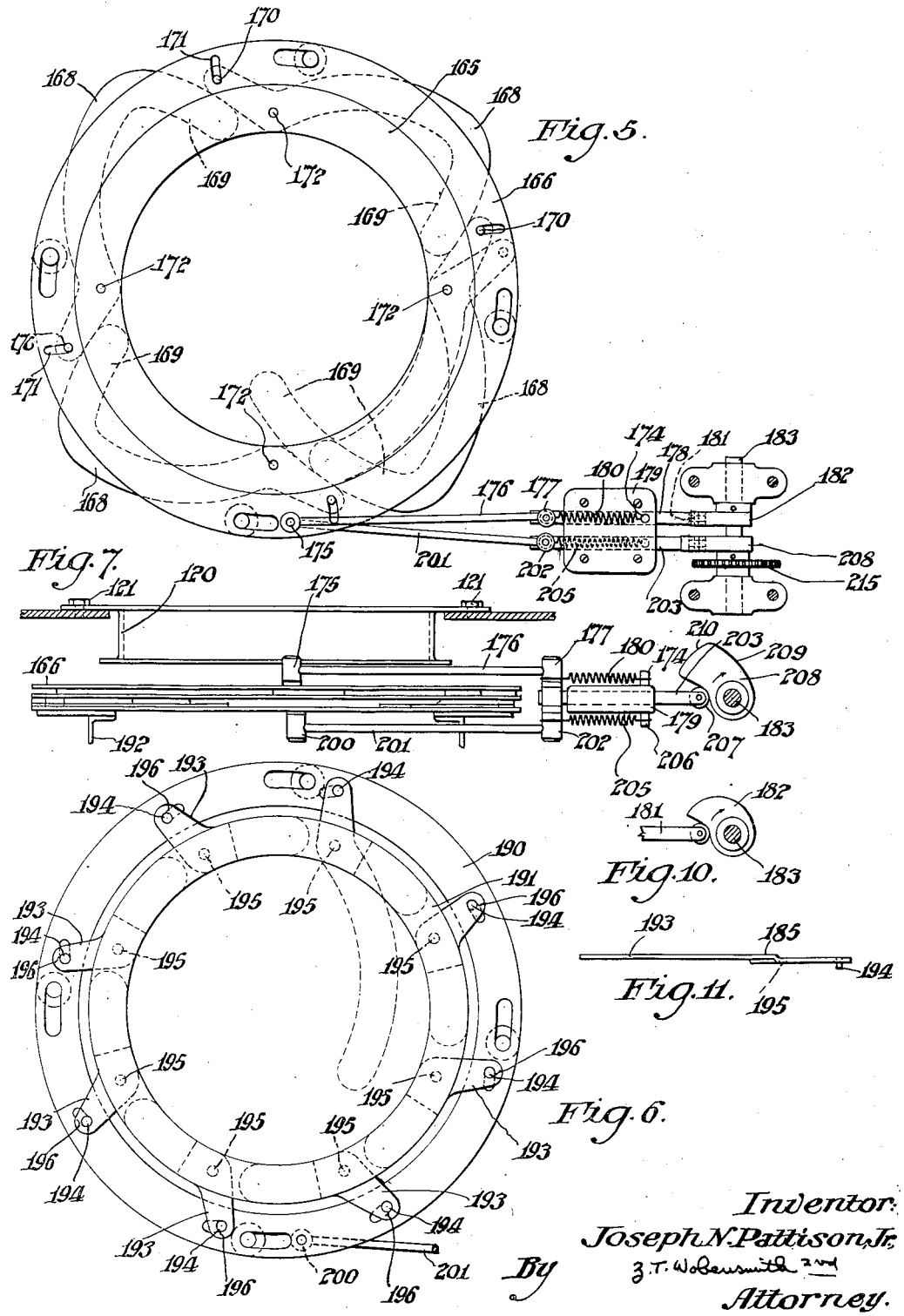

Patented Dec. 14, 1937

2,101,870

UNITED STATES PATENT OFFICE 2,101,870

MACHINE FOR ENVELOPING ARTICLES

Joseph N. Pattison, Jr., Philadelphia, Pa.

Application March 21, 1935, Serial No. 12,181

20 Claims (Cl. 93—2)

The invention relates to machines for enveloping, in a wrapper of synthetic cellulosic sheet material, articles including bakery products such as cakes, pies, and the like.

In the interval between the production by the bakery and the receipt by the consumer of bakery products, some time elapses during which the products may be handled by numerous people, or exposed to many contaminating influences. It is very desirable, under these circumstances, to keep the article in a clean and sanitary condition, as well as to preserve its freshness.

Attempts have been made to wrap articles of this nature, but the devices employed, as well as the wrapped articles, have not proved wholly satisfactory. With certain types of wrapping materials, such as waxed paper, the article may not be closely inspected by the prospective purchaser because the view thereof is obscured by the material which forms the wrapper.

In the wrapping machines heretofore available, no adequate provision has been made for wrapping articles such as cakes having coatings of icing, shredded cocoanut, and the like, or pies with either open faces or top crusts. Articles such as these may not be roughly dealt with, nor turned upside down, without damaging them to such an extent as to spoil their appearance and salability.

An object of the invention, therefore, is the provision of a machine which will expeditiously envelop articles including bakery products such as cakes, pies, and the like, in a transparent covering.

A further object of the invention is the provision of structure for applying a transparent synthetic cellulosic sheet covering to articles such as cakes, pies, and the like, without damage to the article being enveloped.

A further object of the invention is the provision of structure for handling the article to be wrapped while applying the covering material over the top and around the sides of the article, and sealing the covering material under the bottom thereof.

A further object of the invention is the provision of a covering material closing and sealing means in a machine of this character.

A further object of the invention is the provision of means for forming a cushion of covering material below the article wrapped and for sealing the same.

Other objects of the invention will appear from the annexed specification and claims.

The nature and characteristic features of the invention will be more readily understood from the following description, taken in connection with the accompanying drawings forming part hereof, in which:

Figure 1 is a vertical sectional view, taken approximately on the line 1—1 of Fig. 2, and showing the principal features of the present invention;

Fig. 2 is a fragmentary plan view, parts being broken away to show details of construction and the relationship of the conveyor belt, the elevating and sealing mechanism, and the sheet material feeding mechanism, to the main operating mechanism;

Fig. 3 is a fragmentary elevational view taken at the central portion of the machine, showing a part of the conveyor belt, the elevating and sealing mechanism and the operating devices therefor, and the actuating devices for the sheet material feeding mechanism;

Fig. 4 is a fragmentary end elevational view of portions of the structure shown in Fig. 3, as seen from the right, parts being shown in broken section;

Fig. 5 is a plan view of the hold-up device together with a portion of the actuating mechanism for the hold-up device and for the crimper;

Fig. 6 is a plan view of the crimper;

Fig. 7 is an elevational view of the hold-up device and the crimper mechanism;

Fig. 8 is a side elevational view of the sheet material feeding device;

Fig. 9 is a rear elevational view of the sheet material feeding device;

Fig. 10 is an elevational view of a cam employed with the crimper mechanism;

Fig. 11 is a side elevation of one of the crimper fingers showing the offset provided thereon;

Fig. 12 is an elevational view of the intermittent conveyor drive;

Fig. 13 is an elevational view of the intermittent gear train for operating the sheet material feeding structure and the elevator and sealer operating mechanism;

Fig. 14 is a plan view of the levers for operating the elevator and sealer operating mechanism; and Fig. 15 is a fragmentary view showing the sheet holder rod and its clamp.

Before describing in detail a preferred embodiment of the invention, it may be stated that the machine includes an endless conveyor belt, intermittently operated, upon which the unwrapped article may be placed, from which the article is raised for the wrapping or enveloping and to which it is thereafter lowered, and from which the enveloped article may be removed.

With the advance of the article to the place where the wrapping is to be effected, a sheet of wrapping material is brought by suitable mechanism to the proper position for application to the article. After the article arrives at the wrapping station, it is elevated by means of suitable structure above the conveyor belt, and a portion of the wrapping sheet is acted upon by a guide ring, to encase the top and the sides within the sheet of wrapping material. The sheet material is then closed and sealed under the bottom of the article. The article is lowered to the conveyor belt and the belt and article advanced so that the wrapped or enveloped article may be removed by an operator.

It will, of course, be understood that the description and drawings herein contained are illustrative merely, and that various modifications and changes may be made in the structure disclosed without departing from the spirit of the invention.

The details of preferred structure for practicing the invention will now be set forth.

Upon reference to the drawings, 20 represents a frame for supporting the various parts of the machine, including the journals for the shafting, which may be constructed of angles, channels, or the like, extending horizontally and vertically, and suitably braced at the corners. Cover plates 21 are provided for preventing access of dust and dirt to the interior portions of the machine, and to serve as guards for protecting the operator from moving parts.

An endless conveyor belt 22, which is adapted to receive the article to be enveloped and to advance with said article carried thereon, comprises a series of plates 23, and two conveyor chains 24 and 25 to which the plates are connected as at 26. The upper portion of the conveyor belt is guided and supported by conveyor driving gears 27, carried by a conveyor drive shaft 28, and conveyor supporting gears 29, carried by a conveyor shaft 30. The lower portion of the conveyor belt 22 is guided by the guide pinions 31 mounted upon suitable pinion shafts 32.

Horizontal guide rails 33 at the upper portion of the belt 22, for guiding and supporting the horizontal operating portion of the conveyor belt 22 and the articles carried thereby, are provided. Guide rails 34, horizontally disposed, are also provided at the lower portion of the conveyor belt 22.

Each of the plates 23 of the conveyor belt 22 has an opening or aperture 35 formed therein, which is somewhat less in diameter or longest dimension than the article. The aperture 35 is preferably circular, although it may be given any other desired shape. A support for the article is thus provided having an opening presented below the bottom of the article for purposes hereinafter pointed out.

Article locating or centering devices are mounted on each of the plates 23 of the conveyor belt 22, and include dished plate members 36 each having a bottom portion conforming to the dimensions of the article. An aperture 37 of the same size as, or slightly larger than, the aperture 35 of the plate 23, is provided in the bottom portion. The dished plate members 36 have circumferential rim portions 39, and sloping side portions 38 between the rim portions 39 and the bottom portion for guiding an article into its resting place on the bottom portion.

Posts 40, detachably secured to the plates 23 of the conveyor belt 22, hold the dished plate members 36 at their rim portions 39 in predetermined relationship to the plates 23. If a smaller article of the same or different shape is to be enveloped by the machine of the present invention, a different and suitably shaped dished member may be nested in the dished plate member 36, and secured to the rim portion 39 by suitable wire clips. It will of course be understood that a dished plate member of different size and shape may be substituted for that shown.

The conveyor belt 22 is adapted to be advanced, step by step, by the movement of the conveyor drive shaft 28. The conveyor drive shaft 28 has secured thereto a follower gear 45, which meshes with and is driven by the driving gear 46 which is mounted on a shaft 47. One portion of the circumference of the driving gear 46 is provided with teeth as at 48, and the remaining portion 49 thereof is equidistant from the axis of rotation and conforms to the pitch line of the teeth 48.

The follower gear 45 is provided with two toothed portions 50 and 51, and two concaved portions 52 and 53 for contact with the portion 49 of the gear 46. The shaft 47 is driven, as hereinafter pointed out, by a suitable source of power, and it will thus be seen that the conveyor drive shaft 28, and the conveyor belt 22, are actuated in such manner as to have equal periods of advance and rest, for purposes which are hereinafter pointed out.

A preferred form of cover sheet supplying mechanism is illustrated in Figs. 8 and 9, the same being located adjacent the central portion of the machine.

A stack of sheets of covering or enveloping material, preferably of transparent synthetic cellulosic character such as "Cellophane", is shown at 55, and is carried on a removable tray 56 which is accessible from the rear side of the machine. The ends of the sheets overlap the end portion 57 of the tray, as at 58.

A drive shaft 59 is provided, and has a chain sprocket 60 thereon for actuation, through a chain 61, from the sprocket 62 on the shaft 63. The drive shaft 59 has mounted thereon, for rotation therewith, a drum or large roller 64 with suitable surfacing material thereon.

The drive shaft 59 carries thereon, at each end, duplicate driving and control mechanism for the cover sheet supplying mechanism. A description of the structure at one end will suffice.

At each end, therefore, there is provided a pinion 65 which meshes with a gear 66, which in turn is in engagement with a gear 67 on a cam shaft 68.

The cam shaft 68 drives a cam 69 which is mounted thereon. The cam 69 has a groove 70 in its side, in which a cam follower 71, mounted on a vertical arm 72, is moved. The cam groove 70, as shown in Fig. 8, has a dwell portion 73, a rapid rise portion 74, a further rise portion 75, and a fall portion 76, for actuation of the vertical arm 72. The vertical arm 72 has mounted thereon, near its upper end, a yoke member 77 to which a rod 78 is secured for imparting reciprocatory movement from the vertical arm 72 to a feed arm shaft 79.

The feed arm shaft 79 has mounted thereon one or more feed arms 85, adjustable laterally and vertically. Each feed arm 85 carries a friction cup 86 at the lower end thereof for sweeping or sliding the uppermost sheet from the stack of sheets 55. Each feed arm 85 has a slidable block 87 mounted thereon at its upper portion, springs 88 and 89 being provided on the feed arm 85 above and below the block 87. A collar 90 is adjustably mounted on the upper end of each feed arm 85, and in contact with the spring 88 for varying the force applied against the block 87 by the respective springs 88 and 89.

A clamp 91 is adjustably mounted on the feed arm 85, in contact with the spring 89 for varying the force applied against the block 87 by the springs 88 and 89.

An adjusting screw 92 is provided in the block 87 for preventing rotation of the block with respect to the feed arm shaft 79.

The cam 69 also has on its circumferential edge a dwell portion 93 and a raised portion 94 for contact with a follower 95 carried by a lever arm 96. The lever arm 96 is integral with a swingable bracket member 97 which carries a pinch roll shaft 98 at one end. The shaft 98 has mounted thereon a plurality of pinch rolls 100, for contact with the under side of a sheet of covering material. The raised portion 94 of the cam 69 is adapted to separate the pinch rolls 100 from the large roller 64 during part of the period of movement of the feed arm 85.

The other end of the bracket member 97 has mounted therein a bent rod 101 which extends toward the rear of the machine above the stack of sheets 55. Near the rearward end of the bent rod 101 an adjustable clamp 102 is provided, in which a sheet holder rod 103 is mounted. The sheet holder rod 103 extends generally parallel to the drive shaft 68 and across the upper face of the stack of sheets 55, for engagement with the rear portion of the upper sheet of the stack at certain predetermined intervals.

The cam shaft 68 also has mounted thereon a crank 104 to which a connecting rod 105 is pivotally attached at one end. This rod 105, at its other end, is pivotally connected to an arm 106 which is connected to the feed arm shaft 79.

This structure controlled by the feed cam 69 and the crank 104 effects a partial rotation of the shaft 79 to effect the sweeping or sliding of the uppermost sheet of the stack to bring the same into position for engagement between the feed roll 64 and the pinch rolls 100, and to return the feed arm 85 after the delivery of the sheet to the rolls has been accomplished.

The other portions of the present invention do not necessitate the use of sheet material taken from stacked piles, but a roll of sheet material with suitable feeding and cutting mechanism may be substituted if preferred.

A clutch mechanism 107 is interposed on the shaft 63, of a type which is adapted to reengage, after disengagement, only when the portions of the shaft connected thereby are in the proper angular relationship.

The shaft 63 has a bevel gear 108 thereon which meshes with a bevel gear 109 on a shaft 110. The shaft 110 is driven by an intermittent gear train which includes a driving gear 111 which has one portion of its circumference, as at 112, provided with teeth, and the remaining portion thereof is equidistant, as at 113, from the axis of rotation and conforms to the pitch line of the teeth 112. A follower gear 114, keyed to the shaft 110, has two portions concaved, as at 115, to conform to the portion 113 of the gear 111, and two portions provided with teeth, as at 116, adapted to mesh with the teeth 112 of the driving gear 111. The gear 111 is keyed to a shaft 117.

At the central portion of the machine, and located above the place to which the sheet material is supplied, a crimper ring or collar 120 is provided, of suitable lateral dimensions and of a shape to accommodate the article to be enveloped as well as the sheet material. While a circular ring is illustrated, since this is the shape preferably employed for the enveloping of round cakes, pies, or hearth loaves, it will of course be understood that for a cake of semi-circular, triangular, or any other predetermined horizontal cross section, a ring of appropriate shape would be substituted.

Suitable fastening means for securing the ring to the frame, such as the bolts 121, are used in order that the substitution, if desired, of a different shape or size of ring may be readily effected.

Elevating and sealing mechanism is provided below the ring 120 and the conveyor belt 22, and in generally co-axial relationship with the ring 120. This mechanism includes upwardly extending elevator arm members 125, spaced on and carried by an elevator plate 126. The elevator plate 126 is supported by a slidable elevator tube 127 journaled in a bearing member 128 which is attached, as at 129, to a portion of the frame.

At the lower end of the elevator tube 127 a collar 130 is provided, in which oppositely disposed pins 131 are mounted for slidable engagement in slots 132 of an elevator actuating lever 133. The elevator actuating lever 133 may be pivoted on the shaft 110 but is not operated by that shaft. The lever 133 has a cam follower roller 134 mounted thereon for contact with and actuation by an elevator cam 135. This cam 135 has portions thereon to raise the elevator, as at 136, to lower the elevator, as at 137, to raise the elevator a second time, as at 138, and to lower the elevator, as at 139, and is mounted on a cam shaft 140.

A sealing head 145 is provided which preferably includes an electrically heated element within the upper portion of said head, supplied with electric energy by suitable conductors (not shown). The upper face of the sealing head 145 may have any desired imprint in reverse thereon, to be impressed upon the material forming the wrapper, for the purpose of identifying the maker of the product. If desired, however, the sealing head 145 may have suitable devices therein for supplying labels with adhesive thereon to the upper face of said sealing head.

The sealing head 145 is mounted upon a sealer tube 146, slidably journaled in a bushing 147 within the elevator tube 127. At the lower end of the sealer tube 146 pins 148 are provided for engagement in slots 149 in a sealer actuating lever 150. The sealer actuating lever 150 may be pivoted on the shaft 110, but is not operated by that shaft. The lever 150 has a cam follower roller 151 mounted thereon for contact with and actuation by a sealer cam 152. This cam 152 has portions thereon for effecting a raising and lowering of the sealing head at predetermined time intervals. A cam portion 153, which is adapted to hold the sealing head at its highest point after it has been raised by the cam portion 154, is arranged to be effective when the portion 137 of the cam 135 has caused the elevator mechanism to be lowered. The sealer cam 152 is carried by the cam shaft 140, which shaft has keyed thereto a follower gear 155. This gear has a portion provided with teeth 156 which mesh with the teeth 112, and the remaining portion of the gear is concaved as at 157 for contact with the portion 113 of the gear 111.

It will be noted that the elevator and sealer operations are timed at 180° from the feeding of the sheet material as well as from the movement of the conveyor belt, so that portions of the elevating and sealing mechanism may be moved upwardly through the aperture 35 and through the aperture 37 when the conveyor belt 22 is at rest.

An article supporting or holding device is provided immediately below the crimper ring 120, and includes concentric ring members 165 and 166. The inner ring member 165 is fixed against rotation by the brackets 167, and has pivotally mounted with respect thereto a plurality of horizontally disposed hold-up fingers 168. Each of these fingers 168 is hooked as shown at 169, so that upon inward movement thereof the inner end portion of each finger will pass by without contacting the upwardly extending elevator arm members 125 of the elevating mechanism. The outer end portions of the fingers 168 are provided with pins 170, and the fingers are pivotally mounted, as at 172, with respect to the inner ring 165.

The outer ring 166 of the holding device is movable with respect to the inner ring 165, and is provided with slots 171 for the reception of the pins 170 on the fingers 168. Partial rotation of the outer ring 166 will cause the inner ends of the fingers 168 to move inwardly to a supporting position. The fingers are not moved inwardly to an extent, however, which would interfere with upward movement of the sealing head 145.

A post 175 is pivotally connected to the upper side of the outer ring 166, and has secured thereto an actuating rod 176 which is in turn secured to a bar 177. The bar 177 is connected to and adapted to be reciprocated by an operating rod 178 which is journaled between the guide plates 179. A spring 180 is connected to the bar 177 and to a stud 174 on the top of one of the guide plates 179, and is adapted to urge the hold-up fingers 168 to their outward position.

The end of the operating rod 178 is provided with a cam roller 181 for contact by a hold-up cam 182 on a cam shaft 183. This cam 182 has a rising portion for effecting inward movement of the hold-up fingers 168 during the short interval in which the lowering of the elevator arm members 125 is brought about by the portion 137 of the elevator cam 135.

The sheet material closing device is located below and adjacent the holding device, and is somewhat similar thereto in construction and operation. The closing device includes an inner closing ring 191 and an outer closing ring 190. The closing rings 190 and 191 are supported by brackets 192, and the ring 191 has pivotally mounted thereon the horizontally disposed closing fingers 193. Each of these fingers 193 is curved to effect a closing operation upon the covering material initially gathered by the supporting fingers 168. The outer end portions of the closing fingers 193 are provided with pins 194. Each of the closing fingers 193 is provided with an offset, as at 195, so that these fingers may nest when in their outer and open position.

The outer closing ring 190 is concentric with and spaced from the inner closing ring 191, and has slots 196 for the reception of the pins 194 on the closing fingers 193. Partial rotation of the outer ring 190 will cause a movement of the closing fingers 193 about their pivots at 195, and the inner ends of the fingers 193 will move inwardly, gathering and closing the portions of the covering sheet material which are below the article to a position where they may be acted upon by the sealing head 145. The fingers 193, although moved so that their ends are nearer the center (indicated in dotted lines in Fig. 6), are arranged so that sufficient space is provided at the center for movement between their ends of the sealing head 145.

A post 200 is pivotally connected to the lower side of the outer closing ring 190, and has secured thereto a closer actuating rod 201 which is secured to a closer bar 202. The closer bar 202 is connected to the closer operating rod 203 which is journaled between the guide plates 179. A spring 205 is connected to the closer bar 202 and to a stud 206 on the bottom of one of the guide plates 179, and is adapted to urge the closer fingers 193 to their outward positions.

The end of the closer operating rod 203 is provided with a closer cam roller 207 for contact with a closer cam 208 on the cam shaft 183. This closer cam 208 has a rising portion 209 for initiating inward movement of the closer fingers 193, and has a dwell portion 210 adapted to maintain the closer fingers 193 in their innermost position for a sufficient time to effect the sealing operation by the sealing head 145.

The cam shaft 183 is driven by a chain sprocket 215 thereon, which is driven by chain driving devices 216, 217, 218, 219, 220, and 221, from the shaft 140. The operation of the article supporting and sheet material closing mechanism is thus controlled from the same shaft that controls the elevating and the sealing mechanism.

An electric motor 225, or other suitable source of power, may be provided, preferably within the confines of the frame 20, and a pulley 226 mounted on the driving shaft of the motor is connected by a belt 227 to a pulley 228 on a shaft 229. A clutch mechanism 230 may be interposed on the shaft 229 between the pulley 228 and a cone pulley 231, also mounted on the shaft 229.

An oppositely arranged cone pulley 232, on a jack shaft 233, and connected to the cone pulley 231 by the belt 234, is provided for the purpose of permitting variation of the speed of the mechanism within predetermined limits. The jack shaft 233 carries thereon a toothed pinion 236.

A driving chain 237 meshes with the toothed pinion 236 and also meshes with a pinion 238 on a speed reducer 239. The shaft 47, which is on the slow speed side of the speed reducer 239, has, as pointed out above, the gear 46 keyed thereto.

The jack shaft 233 also carries thereon a toothed pinion 240. A driving chain 241 meshes with the toothed pinion 240, and also with a pinion 242 on the shaft of a speed reducer 245. The shaft 117, which is on the slow speed side of the speed reducer 245, has, as hereinbefore pointed out, keyed thereto a gear 111 which forms a part of the intermittent gear train.

The operation of various parts of the machine has been indicated, but a description of the interrelationship of the cooperating portions of the machine may now be set forth.

Assuming that the motor 225 is operating, rotation of the motor shaft will drive the pulley 226, and the belt 227 will cause the pulley 228 to rotate. The driving portions of the clutch 230 are placed in engagement, rotation of the cone pulley 231 is effected, and the belt 234 on the pulley 231 will effect rotation of the jack shaft 233 on which the pulley 232 is mounted.

From the jack shaft 233 driving force is transmitted through the pinion 236, the chain 237, the pinion 238, and the speed reducer 239 to the gear 46 on the shaft 47. This gear 46 presents alternately to the follower gear 45 its toothed portion 48 and its smooth portion 49, and the conveyor drive shaft 28 rotates and remains at rest by turns.

Rotation of the conveyor drive shaft 28 is translated by the conveyor drive gear 27, and the conveyor belt chains 24 and 25, into movement of the conveyor belt 22. The period of movement of the conveyor belt alternates with an equal period of rest, so that an unwrapped article, preferably having a cardboard disk or plate thereunder, placed upon a conveyor plate 23 at rest, will be advanced in two steps to a station at the central portion of the machine, where where the envelope takes place during a period of rest, and then advanced in two steps to the station from which the enveloped article may be removed during the succeeding rest period. Unwrapped articles may thus be placed successively upon the conveyor belt, and enveloped articles removed from the other horizontal end of the conveyor belt, while the enveloping operation is proceeding at the central portion of the machine.

As the conveyor belt 22 starts in motion, movement of a sheet of covering material is initiated, since, as heretofore stated, the cover sheet supplying mechanism is timed to operate in synchronism with the movement of the conveyor belt. Rotation of the jack shaft 233 effects rotation of the sprocket 240, the chain 241, the sprocket 242, the shaft of the speed reducer 245, and the shaft 117 to which the gear 111 of the intermittent gear train is keyed.

The gear 111 presents alternately its toothed portion 112 and its smooth portion 113 to the follower gear 114, and this effects alternate movement and stopping of the shaft 110. This motion is transmitted by the shaft 110 through the bevel gears 109 and 108, the shaft 63 with the clutch 107 associated therewith, the sprocket 62, and the chain drive mechanism 61, to the drive shaft 59 which carries the feed drum 64.

The cam shaft 68 is operated with the shaft 59 through the gears 65, 66, and 67. Movement of the cam shaft 68 effects a movement of the crank 104, which through the connecting rod 105 and the arm 106, brings about a partial rotation of the feed arm shaft 79. The movement of this shaft 79 causes the feed arms 85 to sweep the top sheet of covering material from the stack 55 into contact with the feed roll 64. As the feed arm 85 comes to the end of its stroke, as indicated in dotted lines in Fig. 8, the sheet is moved into contact with this roll 64, and the pinch rolls 100 are brought up into engagement with the lower face of the cover sheet by the follower 95 passing to the dwell portion 93 of the cam 67. The sheet holder rod 103 at this time falls to its holding position upon the stack of sheets 55.

As the feed arm 85 comes to the end of its stroke also, the vertical arm 72 is moved sharply by the portion 74 of the cam 67, to raise the feed arm 85 and the friction cup 86 thereon out of contact with the stack of sheets 55. The return movement of the feed arm 85 by the crank 104 is thus effected above and out of contact with the stack of sheets 55, the follower riding in the portions 75 and 76 of the cam 67 and maintaining the vertical arm 72 in a position in which the feed arm 85 is elevated until it reaches its initial position.

When the conveyor belt 22 comes to rest, in accordance with the control of the intermittent gears 45 and 46, the elevator mechanism is set in operation to raise the article to be enveloped from its resting place on the plate 23. The rotation of the jack shaft 233 is transmitted from the pinion 240 through the chain 241 and the pinion 242 to the speed reducer 245. The shaft of the speed reducer is rotated, and causes the shaft 117 and the gear 111 of the intermittent gear train to operate. This gear 111 is in a position at this time to present to the follower gear 155 its toothed portion 112 and the rotation of the shaft 140 thereby effected will cause rotation of the elevator cam 135.

The follower 134 and the elevator lever 133 to which it is connected are raised, and this movement is transmitted to the elevator tube 127. The elevator arm members 125 at the top of the elevator tube 127 move upwardly with the tube 127, pass through the alined aperture 35 in the plate 23, and through the aperture 37, and contact the lower side of the article.

The article is moved upwardly by further raising of the elevator arm members 125, and this movement of the article will cause it to contact with the sheet of covering material heretofore brought to proper position by the cover sheet feed mechanism. Upon further upward movement of the elevator arm members 125, the sheet will be deflected down around the sides of the article by the crimper ring 120, as indicated in dotted lines in Fig. 4. It will be noted that the depth of the crimper ring 120 is not required to be the same as the depth of the article to be enveloped, so that, irrespective of the depth of the article the enveloping will take place.

As the elevator nears the uppermost position, the hold-up fingers 169 are moved inwardly. This is accomplished by the action of the cam 182, in overcoming the force exerted by the spring 182 on the follower roller 181, which, through the operating rod 178, the bar 177, the rod 176, and the post 175, brings about a partial rotation of the outer ring 166, so that the ends of the hold-up fingers 168 are forced inwardly by the sliding of the pins 170 in the slots 171. This inward movement of the hold-up fingers 168 initially gathers together the downwardly projecting portions of the sheet material.

When the hold-up fingers 168 have reached their innermost position, the elevator arm members 125 are lowered a short distance, this being brought about by the portion 137 of the elevator cam 135, the weight of the article being sustained by the hold-up fingers.

The fingers 193 of the sheet material closing device may then be brought to their innermost position without interference with the elevator arm members 125. This is accomplished under control of the closer cam 208, acting against the force exerted by the spring 205, which, through the closer cam roller 207, the closer operating rod 203, the closer bar 202, the rod 201, and the post 200, effects a partial rotation of the outer closer ring 190. This partial rotation of the ring 190 causes the ends of the closer fingers 193 to move inwardly by reason of the sliding of the pins 194 in the slots 196.

The inward movement of the closer fingers 193 gathers together, into a plurality of folds under the article, the sheet material initially gathered by the hold-up fingers 168, to form a cushion of covering material and to maintain the same in position for the sealing operation.

Rotation of the shaft 140, referred to above, while operating the elevator cam 135, also rotates the sealer cam 152. The sealer lever 150 to which the sealer cam follower 151 is connected is raised by the sealer cam 152, and this motion is transmitted to the sealer tube 146. The sealing head 145 lags below the elevator arm members 125 as the latter rise and the sealing head 145 reaches its uppermost position under the control of the sealer cam 152, after the elevator arm members 125 have been retracted and immediately after the closing fingers 193 have reached their innermost position under the control of the closer cam 208.

The sealing head 145 is held at its uppermost position for sufficient time to effect a sealing of the adjacent portions of the covering or enveloping material, and then moves downward. The closing fingers 193 are retracted by the action of the spring 205, under the control of the cam 208.

The elevator arm members 125 are brought up by the portion 138 of the elevator cam 135 to contact the lower portion of the enveloped article, and the hold-up fingers 168 are retracted by the action of the spring 180 but controlled by the cam 182.

The elevator tube 127 and the arm members 125 are then moved downward to deposit the article upon the conveyor plate 23, and continue to move downward to their lowermost position below the plate 23, under the control of the cam 135.

The conveyor belt 22 is now advanced by the gears 46 and 45, and the cycle of operations set forth above is repeated.

It will be seen, therefore, that the present invention provides means for enveloping articles such as bakery products and the like in a transparent covering, expeditiously and without likelihood of injury to the article.

I claim:

1. An article wrapping machine comprising a movable article conveying device, means for supplying with the advance of the conveying device wrapping material above the article to be wrapped, means for moving said article upwardly from said conveying device, means for directing said wrapping material downwardly around the article upon upward movement of the article, means for bringing portions of said wrapping material together under the bottom of said article while the same is elevated, and sealing means movable vertically for securing the said wrapping material under the bottom of said article.

2. An article wrapping machine comprising a movable supporting device, means for supplying wrapping material to the article to be wrapped, means for moving said article from said supporting device and for returning the article thereto, means for directing said wrapping material over the top and around the sides of the article during upward movement of the article, means for bringing portions of said wrapping material together under the bottom of said article while the same is elevated, said means being in vertical alinement with the means for moving the article, and heating means for securing portions of said wrapping material under the bottom of said article prior to the return of the article to the movable supporting device.

3. An article wrapping machine comprising a movable supporting device, means for supplying wrapping material to the article to be wrapped, means for moving said article upwardly from said supporting device and returning the article thereto, means for directing said wrapping material downwardly around the article upon upward movement of the article, means for bringing portions of said wrapping material together under the bottom of said article while the same is elevated, said means being in vertical alinement with the means for moving the article and means for sealing portions of said wrapping material under the bottom of said article while the same is elevated, said means being coaxial with the means for moving the article.

4. An article wrapping machine comprising a horizontally movable article supporting device provided with an aperture therethrough, means for supplying wrapping material to the article to be wrapped, means for moving said article upwardly, said means including devices adapted to be advanced through said aperture for elevating contact with the article to be wrapped, a device for folding said wrapping material downwardly around the sides of the article as the same is elevated, an auxiliary article supporting device above said movable supporting device, means for urging said wrapping material under the article, and means vertically movable for securing the wrapping material under the bottom of said article.

5. An article wrapping machine comprising a horizontally movable article supporting device provided with an aperture therethrough, means for supplying wrapping material to the article to be wrapped, means for moving said article upwardly, said means including devices adapted to be advanced through said aperture for elevating contact with the article to be wrapped, a device for folding said wrapping material downwardly around the sides of the article as the same is elevated, an auxiliary article supporting device above said movable supporting device, means associated with said auxiliary supporting device for directing said wrapping material under the article, and means for sealing the wrapping material under the bottom of said article when the same is elevated, said means having a portion adapted to be advanced through the aperture in the supporting device.

6. An article wrapping machine comprising a horizontally movable article supporting device provided with an aperture therethrough, means for supplying wrapping material to the article to be wrapped, means for moving said article upwardly, said means including devices adapted to be advanced through said aperture for contact with the article to be wrapped, a device for folding said wrapping material downwardly around the sides of the article as the same is elevated, an auxiliary article supporting mechanism above said movable supporting device, mechanism above said movable supporting device for directing said wrapping material under the article, and means for sealing the wrapping material under the bottom of said article when the same is elevated, said sealing means having a portion adapted to be advanced through the central portion of the auxiliary article supporting mechanism and of the wrapping material directing mechanism.

7. In an article wrapping machine, an article supporting device, cam controlled means for elevating the article to be wrapped with respect to said supporting device and for holding said device elevated, and means for wrapping and sealing said article within a wrapper while in an elevated position, said means having a portion movable from a position below said supporting device to a position above said supporting device for sealing the article in the wrapper.

8. In an article wrapping machine, an article supporting device, means for raising the article to be wrapped from said supporting device for encasing the article in a wrapper, said means including members contacting the lower portion of the article, and a cam controlled heating device for sealing the wrapper operable with said raising means.

9. In an article wrapping machine, an article supporting device, cam controlled means for raising the article to be wrapped from said supporting device, said means including members contacting the lower portion of the article, means for supporting said article after the same is raised, and a cam controlled wrapper sealing device operable with said raising means.

10. In an article wrapping machine, a conveyor, means for raising from said conveyor an article to be wrapped, a device fixedly mounted above said conveyor adapted to direct wrapping material downwardly with respect to the article, and means below said device and above said conveyor for closing the wrapping material below the article to be wrapped, said means having a plurality of parts swingable into a wrapping material closing position below the article.

11. In an article wrapping machine, conveyor means adapted to be advanced and to be maintained at rest for predetermined periods, means for supplying covering material for the article as the article is advanced, and means for encasing and sealing the article within the covering material during the predetermined period of rest, said means including devices for moving the article during the period of rest from the conveyor means for the encasing and sealing operations and for returning the article during the same period of rest to the conveyor means upon the completion of the encasing and sealing operations.

12. In an article wrapping machine, the combination of a supporting device for an article to be wrapped, said supporting device including a rotatable ring carrying a plurality of fingers movable into article supporting position beneath said article upon movement of the ring, and means for bringing together portions of the sheet material for securing the same together, said means including a second rotatable ring carrying a plurality of fingers movable into securing position upon movement of the second rotatable ring.

13. In an article wrapping machine, the combination of a cam controlled supporting device for an article to be wrapped, said supporting device including a rotatable ring carrying a plurality of fingers movable into article supporting position beneath said article upon movement of the ring, cam controlled means for bringing together portions of the sheet material for securing the same together, said means including a second rotatable ring carrying a plurality of fingers movable into securing position upon movement of the second rotatable ring, and a sealing means movable into a space within the inner ends of all of said fingers.

14. In an article wrapping machine, an article conveying device, means for elevating from the conveying device the article to be wrapped, said means including a vertically movable operating member, and means for sealing the wrapping material, said means being coaxial with said elevating means and including an operating member in telescoping relationship with said movable member.

15. An article wrapping machine including means for supplying wrapping material above the article to be wrapped, means for moving said article upwardly, a ring fixedly mounted in the machine for folding the wrapping material downwardly during upward movement of the article, means for supporting the article in an elevated position, said means being operative on the bottom of the article, means for urging the wrapping material under the article, and means for securing the wrapping material under the bottom of the article, said means being movable through the means for urging and the means for supporting.

16. An article wrapping machine including means for supplying wrapping material above the article to be wrapped, a plunger for moving said article upwardly, a ring fixedly mounted in the machine for folding the wrapping material downwardly during upward movement of the article, means for supporting the article in an elevated position, said means being operative on the bottom of the article, means for urging the wrapping material under the article, and means for sealing the wrapping material under the bottom of the article, said means being coaxial with said plunger and being movable through the means for urging and the means for supporting.

17. In a machine for wrapping articles, the combination of a movable article supporting device, means for moving an article from said device, an auxiliary supporting device for said article for holding the same spaced from said movable article supporting device in the station to which it is moved by said means, and a wrapper sealing mechanism having a portion movable past said auxiliary supporting device for sealing the wrapper at said station.

18. In a machine for wrapping an article in sheet material, the combination of a supporting device for an article to be wrapped, said supporting device including members having a plurality of fingers movable into article supporting position beneath said article, and means for bringing together portions of the sheet material for securing the same together, said means including other members having a plurality of movable fingers operable on said sheet material.

19. In an article wrapping machine, the combination of a wrapper sealing means, a supporting device for an article to be wrapped, said supporting device including a rotatable ring carrying a plurality of fingers movable into article supporting position beneath said article upon movement of the ring, and means for bringing together portions of the wrapper for sealing, said means including a plurality of rings having a plurality of fingers movable into supporting position upon movement of one of said last mentioned rings, said latter fingers providing a space between their adjacent inner ends for the reception of the sealing means.

20. In an article wrapping machine, conveyor means for articles to be wrapped, operating mechanism for said conveyor means for advancing and maintaining at rest said conveyor means for predetermined periods, means for supplying covering material during each period of advance above one of the articles to be wrapped, means for elevating the same article above which covering material is supplied by said supplying means from the conveyor means and for returning the article to the conveyor means during each period of rest, and means for encasing and sealing the same article within the covering material during each period of rest.

JOSEPH N. PATTISON, Jr.